(12) United States Patent
Turki et al.

(10) Patent No.: US 11,551,018 B2
(45) Date of Patent: Jan. 10, 2023

(54) RADIO-FREQUENCY IDENTIFICATION (RFID) TAGS FOR LIQUID MONITORING

(71) Applicant: HID Global Corporation, Austin, TX (US)

(72) Inventors: Badredin Mohamed Turki, Farnham (GB); Charles Vilner, Crawley (GB)

(73) Assignee: HID Global Corporation, Austin, TX (US)

( * ) Notice: Subject to any disclaimer, the term of this patent is extended or adjusted under 35 U.S.C. 154(b) by 0 days.

(21) Appl. No.: 17/522,479

(22) Filed: Nov. 9, 2021

(65) Prior Publication Data
US 2022/0156473 A1 May 19, 2022

Related U.S. Application Data

(60) Provisional application No. 63/113,474, filed on Nov. 13, 2020.

(51) Int. Cl.
*G06K 7/10* (2006.01)
*G06K 19/077* (2006.01)
*G06K 19/07* (2006.01)

(52) U.S. Cl.
CPC ..... *G06K 7/10386* (2013.01); *G06K 19/0723* (2013.01); *G06K 19/07773* (2013.01); *G06K 2007/10524* (2013.01)

(58) Field of Classification Search
CPC ........... G06K 7/10386; G06K 19/0723; G06K 19/07773
USPC ........................................................ 235/451
See application file for complete search history.

(56) References Cited

U.S. PATENT DOCUMENTS

| | | |
|---|---|---|
| 2007/0152833 A1 | 7/2007 | Kaplan et al. |
| 2010/0021993 A1 | 1/2010 | Wang et al. |
| 2014/0121557 A1 | 5/2014 | Gannon et al. |
| 2014/0182845 A1 | 7/2014 | Roberson et al. |
| 2016/0210370 A1 | 7/2016 | McQuade et al. |

OTHER PUBLICATIONS

International Search Report and Written Opinion for International Patent Application No. PCT/US2021/058642; dated Feb. 8, 2022 (10 pages).
"RFID Tag Antenna Based Sensing: Does your Beverage Glass need a Refill?"; Rahul Bhattacharyya, et al.; 2010 IEEE International Conference on RFID, pp. 126-133 (Apr. 2010).

(Continued)

*Primary Examiner* — Allyson N Trail
(74) *Attorney, Agent, or Firm* — McDonnell Boehnen Hulbert & Berghoff LLP

(57) ABSTRACT

Example embodiments relate to radio-frequency identification (RFID) tags for liquid monitoring. An example RFID tag includes an antenna configured to communicate with an RFID reader. The antenna includes a radiating plane. The antenna also includes a ground plane. The RFID tag is attachable to a container. A reactance associated with the antenna is modifiable based on a temperature and a volume of a liquid within the container and adjacent to the ground plane. The RFID tag also includes an integrated circuit that includes a memory. The integrated circuit is configured to modulate the antenna in response to an RFID signal from the RFID reader based on the reactance associated with the antenna.

20 Claims, 13 Drawing Sheets

(56) References Cited

OTHER PUBLICATIONS

Product Brief: RFM2100 Flexible Moisture Sensor; Wireless Moisture Sensor, Flexible sensor applications; retrieved from www.RFMicron.com (retrieved on Nov. 6, 2020).

"RFM2100 Wireless Flexible Moisture Sensor"; retrieved from https://axzon.com/rfm2100-wireless-flexible-moisture-sensor/ (retrieved on Nov. 6, 2020).

"RFM3200 Wireless Flexible Moisture Sensor"; retrieved from https://axzon.com/rfm3200-wireless-flexible-moisture-sensor/ (retrieved on Nov. 6, 2020).

RADIO-FREQUENCY IDENTIFICATION (RFID) TAGS FOR LIQUID MONITORING

CROSS-REFERENCE TO RELATED APPLICATIONS

The present application claims priority to Provisional Patent Application No. 63/113,474, filed with the U.S. Patent and Trademark Office on Nov. 13, 2020, the contents of which are hereby incorporated by reference.

BACKGROUND

Unless otherwise indicated herein, the materials described in this section are not prior art to the claims in this application and are not admitted to be prior art by inclusion in this section.

Many industries today rely on radio-frequency identification (RFID) technology to identify, track, and authenticate items. For example, RFID systems may be utilized to determine the current location of articles of interest, inventory control and tracking, asset tracking and recovery, and the like. RFID technology can achieve substantial cost-savings and other operational improvements relative to alternative means of tracking, such as human-readable labels or machine-read barcodes.

SUMMARY

Disclosed herein are RFID tags, systems, and methods that can be used to label/track various items (e.g., liquid containers). The RFID tags, systems, and methods described herein may simultaneously provide monitoring of the temperature of the item being labeled and a liquid level or liquid volume associated with the item (e.g., how much liquid is present within a container). The temperature may be determined by the RFID tag using a temperature sensor of the RFID tag. Further, the liquid level may be determined by the RFID tag based on a change in the reactance of an antenna of the RFID tag.

In one aspect, a radio-frequency identification (RFID) tag is provided. The RFID tag includes an antenna configured to communicate with an RFID reader. The antenna includes a radiating plane. The antenna also includes a ground plane. The RFID tag is attachable to a container. A reactance associated with the antenna is modifiable based on a volume of a liquid within the container and proximate to the ground plane. The RFID tag also includes an integrated circuit that includes a memory and a temperature sensor configured to provide information indicative of a temperature of the liquid within the container. The integrated circuit is configured to: in response to an RFID signal from the RFID reader, modulate the antenna based on the reactance associated with the antenna and a temperature reading of the temperature sensor to provide information indicative of the volume of the liquid within the container and the temperature of the liquid within the container.

In another aspect, a system is provided. The system includes a container configured to be filled with a liquid. The system also includes a radio-frequency identification (RFID) tag attached to the container. The RFID tag includes an antenna configured to communicate with an RFID reader. The antenna includes a radiating plane. The antenna also includes a ground plane. A reactance associated with the antenna is modifiable based on a volume of the liquid within the container and proximate to the ground plane. The RFID tag also includes an integrated circuit that includes a memory and a temperature sensor. The temperature sensor is configured to provide information indicative of a temperature of the liquid within the container. The integrated circuit is configured to: in response to an RFID signal from the RFID reader, modulate the antenna based on the reactance associated with the antenna and a temperature reading of the temperature sensor to provide information indicative the volume of the liquid within the container and the temperature of the liquid within the container.

In an additional aspect, a method is provided. The method includes receiving, at a radio-frequency identification (RFID) tag, an RFID signal transmitted by an RFID reader. The RFID tag includes an antenna. The antenna includes a radiating plane. The antenna also includes a ground plane. The RFID tag is attached to a container. A reactance associated with the antenna is modifiable based on a volume of a liquid within the container and proximate to the ground plane. The RFID tag also includes an integrated circuit that includes a memory and a temperature sensor configured to provide information indicative of a temperature of the liquid within the container. The method also includes modulating, by the integrated circuit in response to the RFID signal, the antenna based on the reactance associated with the antenna and a temperature reading of the temperature sensor to provide information indicative of the volume of the liquid within the container.

These as well as other aspects, advantages, and alternatives will become apparent to those of ordinary skill in the art by reading the following detailed description, with reference, where appropriate, to the accompanying drawings.

DETAILED DESCRIPTION

Figure 1A:
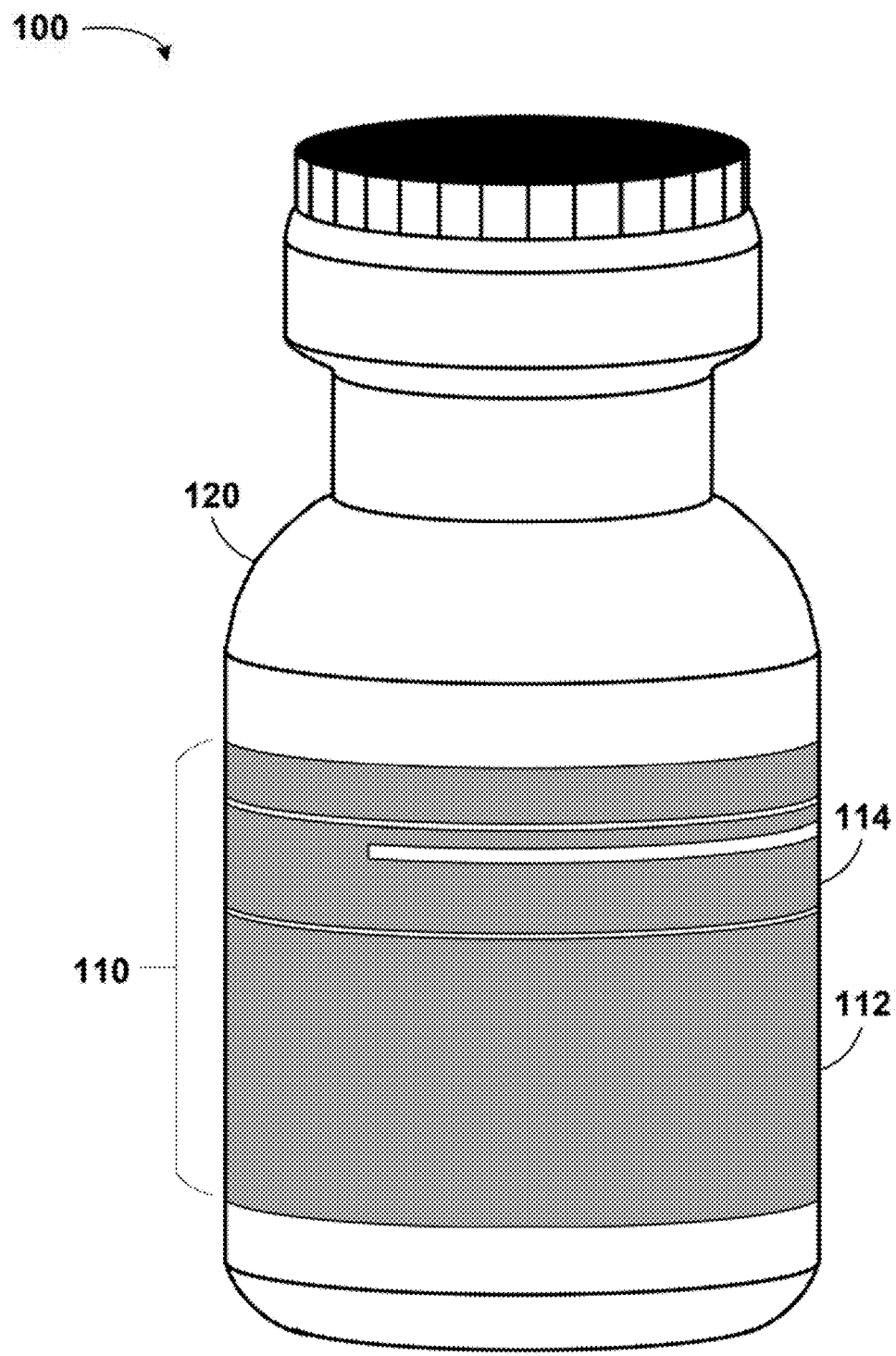
FIG. 1A is an illustration of a system, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

Additionally, the principles described herein (e.g., related to antenna design and/or operation) may be applied to different embodiments. For example, embodiments described herein may encompass different types of liquid containers (e.g., containers made of different materials), different shapes of liquid containers, different sizes of liquid containers, different types of liquid within those containers, different volumes of liquid within those containers, etc.

I. Overview

An RFID tag is provided for measuring a temperature and/or an amount of liquid in a container to which the RFID tag is attached. In some examples, the RFID tag may be specifically configured for consumer applications (e.g., household cleaning products, beverage containers, gasoline tanks, etc.) or sensitive medical transportation applications (e.g., when transporting and/or storing biological samples, medication, or vaccines), where maintaining a desired liquid temperature and knowing the level and/or volume of liquid in the container is important. The RFID tag may be configured to provide such information throughout the life cycle of a tagged container (e.g., a 2.25 mL medical vial utilized in pharmaceutical/biotech applications). In an example embodiment, the RFID tag may provide information indicative of an initial undiluted vaccine liquid level amount (e.g., 0.45 mL), a diluted vaccine liquid level amount (e.g., 2.0 mL), and liquid levels between 2.0 mL and 0.0 mL (e.g., in 0.5 mL intervals) as the undiluted vaccine is diluted and as the diluted vaccine is distributed from the vial.

The RFID tag may include a monopole or quarter-wave antenna (e.g., inverted f-type) design. The RFID tag may also include an integrated circuit configured to detect and report a change in a reactance value of the associated antenna. For example, the RFID tag may include the AXZON MAGNUS-S3 M3D integrated circuit (or similar integrated circuit) or any integrated circuit that is able to detect and report a change in the antenna's reactance. The change in liquid level may correspond to a change in the reactance associated with the antenna, which may cause a change in a frequency response associated with the antenna. As such, a change in frequency response can be correlated to a specific liquid level in the container. In some embodiments, the liquid level information may be recorded in an on-board memory and can be reported to an RFID reader as a sensor code value (e.g., between 5 and 470) and/or a change in the capacitance/reactance value detected by the integrated circuit in response to interrogation by the RFID reader. Further, the change of frequency response may be stored and/or communicated as a percentage change (e.g., a percentage change ranging 3-10%) or as a raw change in Hz (e.g., a raw change ranging between 20 MHz and 30 MHz, such as 25 MHz). Additionally or alternatively, in some embodiments, the change of frequency response may be stored and/or communicated relative to the Federal Communications Commission (FCC) waveband (902-928 MHz) or another waveband (e.g., the European Telecommunications Standards Institute (ETSI) waveband).

As described above, in some applications, it can be desirable to monitor temperature and liquid level within a container over time. For example, in some medical applications (e.g., when delivering medication, vaccines, or biological samples) a container (e.g., a vial or a syringe) may experience a range of temperatures and liquid levels throughout its lifetime. A medication or a vaccine, for instance, may be transported, in bulk, at a first temperature (e.g., a very low temperature between −100° C. and −60° C.) with a first dilution level (e.g., undiluted), may be stored at a second temperature (e.g., a low temperature between −20° C. and 0° C.) with a second dilution level (e.g., undiluted), and then may be administered to a patient at a third temperature (e.g., a room temperature between 20° C. and 30° C.) and a third dilution level (e.g., diluted to a specific molarity based on a dosage amount and/or a method of administration to the patient).

Likewise, beverages (e.g., alcoholic beverages) may be provided to a customer (e.g., at a bar or restaurant) in a container (e.g., a bottle, a pint glass, a plastic cup, or a coffee cup) and it may be desirable to monitor the temperature and liquid level of that container over time. For example, if a customer's beverage runs low, a bartender or server may wish to offer the customer a refill or, if a customer's beverage changes temperature undesirably, a bartender or server may wish to offer to modify the temperature of the customer's beverage (e.g., by adding one or more ice cubes or by adding additional hot liquid, such as additional coffee). Additionally or alternatively, it may be desirable to control a volume of a given beverage provided to a customer to monitor a stock (i.e., reserve inventory) of the given beverage time and/or to ensure sufficient stock over a period of time. This may provide a warning to a bartender that a stock should be replenished in advance of the entire stock being depleted. Still further, it may be desirable to monitor the temperature of a liquid in a container to ensure the temperature comports with certain standards (e.g., to ensure coffee is within an appropriate range of temperatures to be consumed or to ensure that drugs are not being exposed to unsafe temperatures which would result in a loss of potency). Yet further, it may be beneficial to monitor liquid level and temperature of beverages that are distributed directly to customers via a grocery store to ensure that, for example, the beverages remain at an appropriate storage temperature (e.g., in applications involving wine or beer) and does not leak (e.g., to ensure the integrity of glass bottles) prior to being sold to the customer. In addition to monitoring a liquid level and/or temperature, embodiments described herein could be used to monitor a time elapsed (e.g., relative to an expiration date of a liquid) relative to when the container was opened (e.g., first exposed to air). The integrated circuit of RFID tags described herein may store, using a timer option of the integrated circuit, a time elapsed and may compare the time to an expiration date (e.g., stored within a memory of the integrated circuit). The RFID tag may also communicate the expiration date, time elapsed since opening of container, and/or the expiration status (e.g., expired, not yet expired, time remaining to expiration, etc.) to an RFID reader using the antenna.

Additionally or alternatively, some examples could include monitoring the production of mixed liquid products, such as carbonated beverages. For example, a container may be partially filled with a chilled flavored syrup, followed by filling a substantial remaining volume of the container with carbonated water. Embodiments herein may be utilized to confirm proper solution preparation. It will be understood that other types of liquid manufacturing processes may be monitored with an RFID tag configured to measure temperature and liquid volume.

In yet another application, it may be desirable to monitor a liquid level and temperature of fuel (e.g., gasoline) within a fuel tank. Monitoring the temperature may ensure that a combustible liquid is not overheated to a dangerous level. Further, monitoring the liquid level may ensure that a corresponding machine (e.g., vehicle) does not run out of fuel at an inopportune time.

In each of the applications described above (and many others not listed), it may be desirable to monitor the liquid level and/or the temperature of a liquid within a container. However, due to the size and/or form factor of the corresponding container, the location in which the container is stored, the way in which the container is transported, the average temperature at which the temperature is stored, requirements for hermetic sealing, or other factors, it may be difficult or impractical to open the container or otherwise access the liquid so as to measure the liquid level or temperature. Further, to conserve time, it may be desirable to have an individual tag on each of a number of containers (e.g., within a set of containers) that can communicate the liquid level and temperature of the container efficiently back to a computing device or technician.

Hence, described herein are RFID tags capable of communicating both the temperature and the liquid level of a liquid within a container. For example, the RFID tags may be adhered to a container (e.g., a glass container or a plastic container) and may measure the temperature and the liquid level of the liquid within that container. The measured liquid level may also be indicative of a dilution level of the liquid if the liquid is a solution or mixture (e.g., based on a known quantity of underlying solute in addition to the volume of the liquid). Such a dilution level may indicate a dosage level of a medicine or an alcohol by volume (ABV) level of a beverage, for example. The liquid level and temperature may be communicated to an RFID reader (e.g., with an associated timestamp) in response to an RFID signal received from the RFID reader, for example.

In order to measure the temperature of a liquid in the underlying container, the RFID tag may include a temperature sensor (e.g., a temperature sensor that is integrated within the integrated circuit). Further, in order to communicate with the RFID reader (or other devices), the RFID tag may include an antenna (e.g., with a ground plane and a radiating plane). This antenna may generate electromagnetic waves to communicate a message (e.g., a code) to the RFID reader (e.g., in response to an RFID signal from the RFID reader). In addition, though, the antenna may be usable (e.g., by an integrated circuit of the RFID chip, such as the AXZON M3D) to monitor a liquid level of the liquid in the underlying container. As the liquid level in the container rises or falls, a reactance value associated with the antenna may also change (e.g., because the dielectric constant associated with the liquid/container combination is changing due to a change in the proportion of liquid vs. the proportion of air within the container). This change in reactance is reflected in a frequency response associated with the antenna. In other words, the intensity at which the antenna can be excited at different frequencies will change based on the change in reactance (e.g., the resonant frequency associated the antenna will change). Hence, by measuring the change in frequency response associated with the antenna, an underlying change in reactance and, therefore, an underlying change in liquid level can be deduced (e.g., based on one or more of the plots in FIGS. 1D-1F). In this way, an integrated circuit of the RFID chip can measure a change in the liquid level using the RFID antenna, itself, rather than requiring an auxiliary sensor in order to measure liquid level.

When an RFID signal is received by the RFID tag, the RFID tag may communicate a response to the RFID tag. For example, the RFID tag may transmit an RF wave to communicate a message to the RFID reader. Additionally or alternatively, one or more components of the RFID tag may be modulated (e.g., a signal transmitted by the antenna is modulated) in such a way that is measurable by the RFID reader to receive a signal. For example, the RFID reader may be inductively coupled to the RFID tag, and an impedance of the RFID tag may be modulated so as to communicate a message to the RFID reader. In response to receiving the RFID signal from the RFID reader, the RFID tag may communicate a response that includes an identification code associated with the RFID tag, the temperature of the liquid within the container, a liquid level of the liquid within the container, a timestamp associated with the response signal, a timestamp associated with the measurement of liquid level, a timestamp associated with the temperature measurement, and/or a timestamp associated with the status/expiry of the liquid within the container. In some embodiments, such timestamp(s) and/or measurement value(s) (e.g., liquid level and temperature) may be stored in a memory associated with the RFID reader (e.g., a hard drive or in cloud storage) upon the RFID reader receiving the response from the RFID tag. Such measurements and times may, thereafter, be amalgamated into plots of liquid level vs. time and/or liquid temperature vs. time. Additionally or alternatively, in some embodiments, the timestamp(s) and/or the measurement value(s) may be stored onboard a memory of the RFID tag (e.g., a memory associated the integrated circuit of the RFID tag).

While many embodiments described herein include monitoring temperature and/or liquid level of a container holding liquid contents, it is understood that other embodiments are contemplated herein. For example, in some embodiments, a container may hold a gas (e.g., a compressed gas) or a hybrid of a gas and a liquid (e.g., a propane fuel or a butane fuel). In such embodiments, the RFID tags described herein could also be used to monitor temperature within the container and/or a level associated with the contents in the container (e.g., a gas level or a level of the hybrid gas/liquid). For example, an RFID tag as described herein may be affixed to a tank filled with propane (e.g., a plastic tank) and used to monitor the temperature of the propane mixture, as well as a propane level. This may allow, for instance, a determination of the amount of propane remaining in the tank without the need to weigh the tank or use some other device for determining propane level. A gas level or a hybrid gas/liquid level in a container may be determined based on a change in reactance associated with the antenna as the impedance associated with the gas or the hybrid may change with density (e.g., as a compressed gas is depleted, the impedance associated with that gas may change, thereby affecting the reactance associated with the antenna).

In addition to measuring and communicating a temperature and liquid level, embodiments herein may be used to monitor and/or communication certain statuses associated with the container. Such monitoring and/or communication may be performed in response to one or more triggers. For example, the integrated circuit may include a timer functionality. Upon a certain amount of time expiring since the liquid (e.g., a vaccine) has been diluted or since the container has been opened (e.g., the liquid has been exposed to air, such as when a protective seal of the container is breached or broken) a trigger may occur in the integrated circuit (e.g., a trigger may be set based on the integrated circuit executing instructions stored within a memory). The trigger may cause the RFID tag to store a triggered status within a memory and/or to communicate the triggered status to an RFID reader. As another example, a trigger may occur if the temperature of the container/associated liquid falls outside of a predetermined temperature range (e.g., rises above a threshold temperature stored within a memory and/or falls below a threshold temperature stored with a memory). This trigger may, for example, cause the RFID tag to store a triggered status within a memory that indicates that the contents of the container are spoiled/unusable (e.g., in the case of food products or drugs). Other examples of triggers and related responses are also possible and are contemplated herein.

II. Example Systems

The following description and accompanying drawings will elucidate features of various example embodiments. The embodiments provided are by way of example, and are not intended to be limiting. As such, the dimensions of the drawings are not necessarily to scale.

Figure 1B:
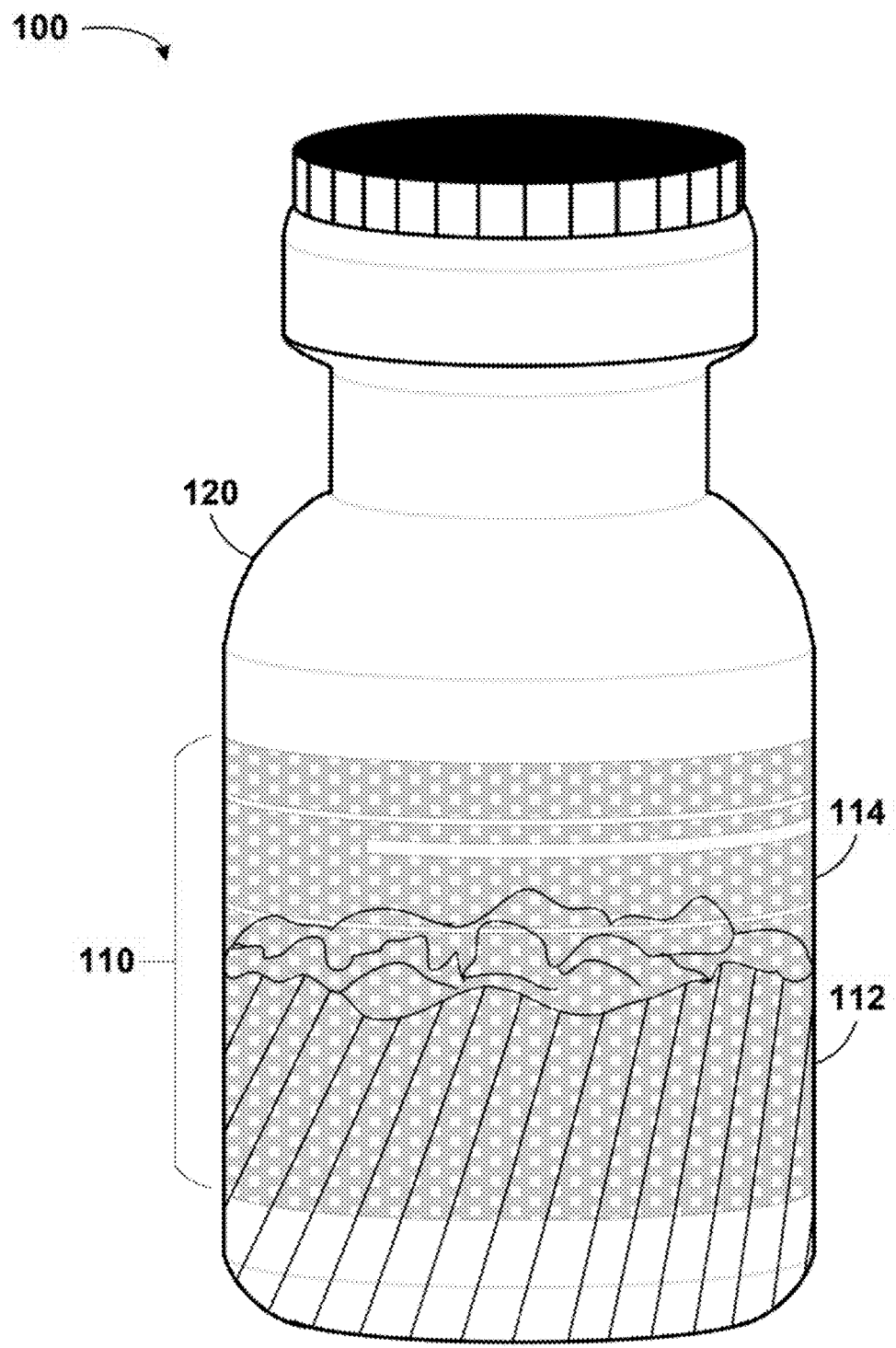
FIG. 1B is an illustration of a system, according to example embodiments.

Referring now to the figures, FIG. 1A is an illustration of a system 100, according to example embodiments. The system 100 may include an RFID tag 110 and a container 120. FIG. 1B illustrates the same system 100, but with the RFID tag 110 and portions of the container 120 being translucent so that a liquid within the container 120 (e.g., a drug or a vaccine within the container 120) is visible. It will be understood that in some examples the container 120 need not be optically translucent or transparent.

The RFID tag 110 may be used to identify the container 120. For example, an RFID reader may communicate with the RFID tag 110 to determine one or more features of the container 120 or of the contents of the container 120. For example, the RFID reader may communicate with the RFID tag 110 to determine: what type of substance is within the container 120 (e.g., a drug, a vaccine, a beverage, a fuel, etc.), an identification (ID) number of the container 120, a date of manufacture of the substance within the container 120, a date of expiration of the substance within the container 120, a date of expiration of the substance once the container is opened, a proper dosage amount for the contents of the container 120 (e.g., when the contents include a drug), a place of origin of the container 120 and/or contents of the container 120, an intended place of delivery for the container 120, etc. In addition, as described herein, the RFID tag 110 may additionally or alternatively provide information about a temperature and/or a liquid level for the contents of the container 120 (e.g., in response to an RFID signal from an RFID reader).

In order to communicate with other devices (e.g., an RFID reader), the RFID tag 110 may include an antenna (e.g., a monopole or quarter-wave antenna, such as an antenna with an inverted L-type design, an inverted f-type design, or a half-wave antenna). The antenna may include ground plane 112 and a radiating plane 114.

Further, in order to process information and/or formulate messages to transmit to other devices, the RFID tag 110 may include an integrated circuit. The integrated circuit may include an on-board memory, a processing device, an impedance sensor (e.g., to measure a reactance associated with the antenna), and/or one or more auxiliary sensors (e.g., temperature sensors, humidity sensors, pressure sensors, etc.). The RFID tag 110 will be further shown and described below with reference to FIG. 2A.

Figure 1C:
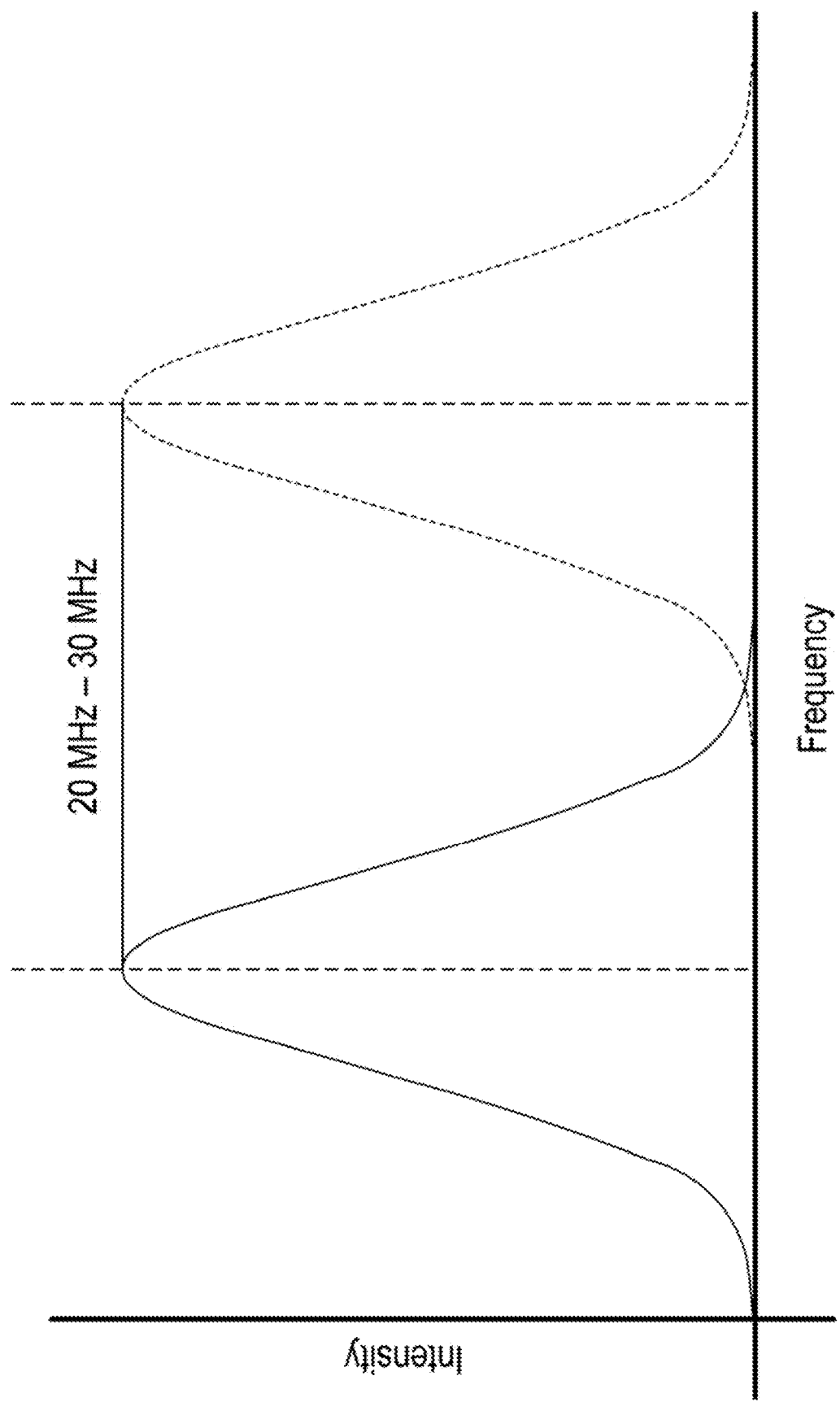
FIG. 1C is an illustration of an illustration of a shift in a frequency response associated with an antenna, according to example embodiments.

The container 120 may be penetrable by electromagnetic waves within the radio-frequency (RF) spectrum. As such, the reactance associated with the antenna (e.g., a reactance of the antenna/liquid combination) may be measured. In some embodiments, an integrated circuit of the RFID tag 110 may determine the liquid level of a liquid inside of the container 120 by measuring the frequency response (e.g., within the RF spectrum, such as the FCC spectrum from 902 MHz 928 MHz, the ETSI spectrum, or the Wi-Fi spectrum) associated with the antenna (e.g., the antenna/liquid combination). For example, when the container 120 is filled to a maximum level (e.g. full or the highest level it will ever reach, such as 10.0 mL), the frequency response associated with the antenna may have a peak intensity corresponding to a first frequency, whereas when the container 120 is filled to a minimum level (e.g., empty or the lowest level it will ever reach, such as 0.5 mL), the frequency response associated with the antenna may have a peak intensity corresponding to a second frequency. This is illustrated in FIG. 1C, where the frequency response associated with the antenna when the container 120 is at a first fill level is illustrated by a solid line and the frequency response associated with the antenna when the container 120 is at a second fill level is illustrated by a dashed line. As illustrated, the difference between the first frequency and the second frequency may be between 20 MHz and 30 MHz, in some embodiments.

Figure 1D:
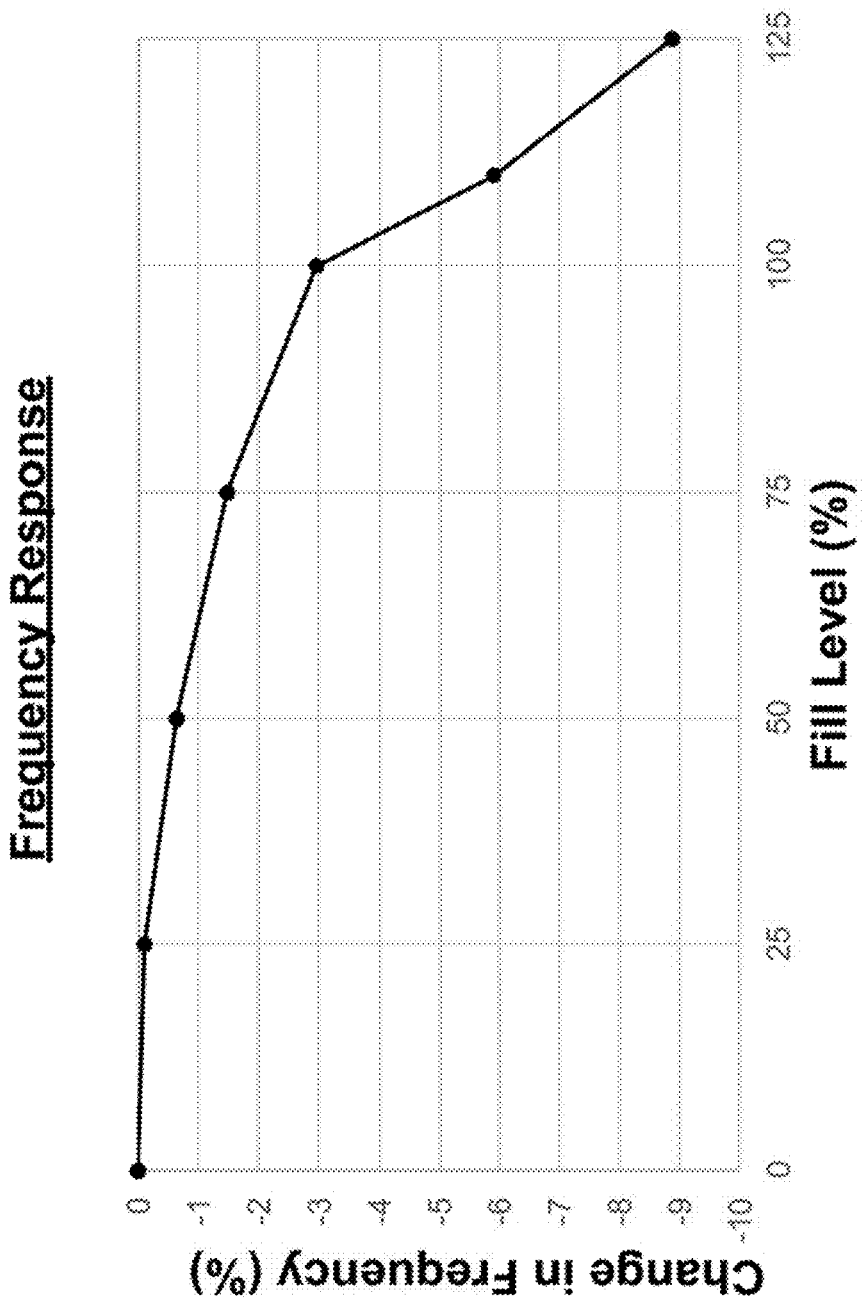
FIG. 1D is an illustration of a frequency response plot for an RFID tag, according to example embodiments.
Figure 1E:
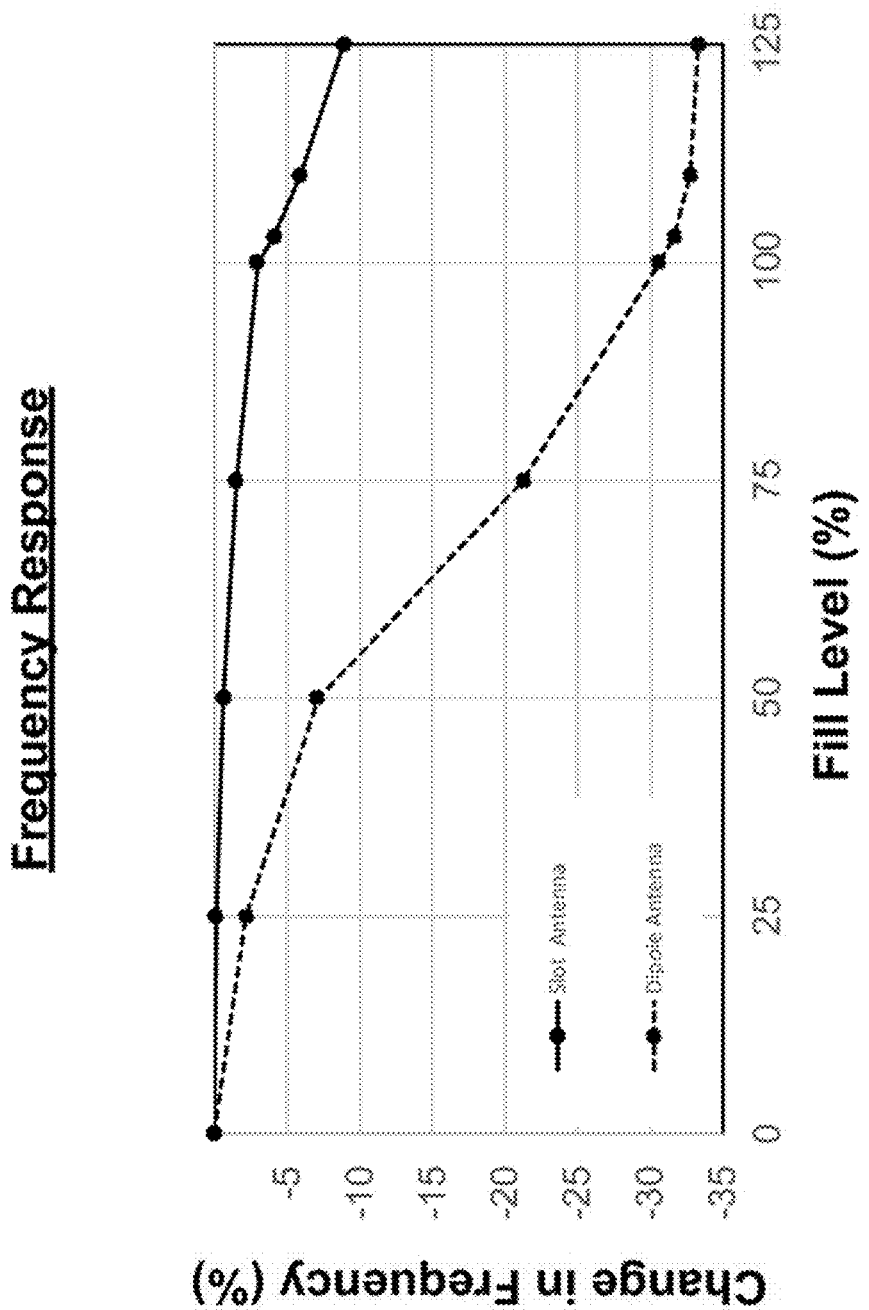
FIG. 1E is an illustration of a frequency response plot for an RFID tag, according to example embodiments.

In some embodiments, this change in frequency response may be represented as a percentage relative to the frequency response at a given fill level. For example, if the center frequency at the minimum fill level (e.g., empty container) is 940 MHz and the center frequency at the maximum fill level (e.g., full container) is 860 MHz, the frequency response at maximum fill may be indicated as having a value of −8.51% (i.e., (860 MHz-940 MHz)/940 MHz). A range of these frequency response values can be measured at different fill levels and then stored (e.g., in a plot and/or lookup table) for later use. FIG. 1D illustrates an example frequency response plot for the RFID tag 110. As indicated in the plot, the change in frequency is represented as a percentage relative to the frequency at the 0% fill level. For example, as illustrated, the change in frequency is: 0% at 0% fill level, about −0.1% at 25% fill level, about −0.6% at 50% fill level, about −1.5% at 75% fill level, about −3% at 100% fill level, about −5.9% at 110% fill level, and about −8.9% at 125% fill level. The points on the plot may represent measured values of frequency response, while the lines connecting the dots may represent interpolations. It is understood that FIG. 1D is provided solely as an example and that other frequency response values are also possible. For example, the amount of change in the frequency based on fill level can be modified based on a size of the container, a shape of the container, the type of liquid used, and/or or the geometry of the antenna used (e.g., increasing the width of one or more slots of a slot antenna may increase the overall change in frequency between 0% fill level and 125% fill level). A frequency response curve/lookup table similar to that illustrated in FIG. 1D may be stored (e.g., in a memory of the RFID tag 110 or an associated RFID reader) and used to determine a fill level based on a measured resonant frequency relative to the known resonant frequency at 0% fill level.

The antennas described herein (e.g., as illustrated and described with reference to FIG. 2) may include slot antennas. Slot antennas may have a less substantial frequency response than a dipole antenna (e.g., an inlay-type dipole antenna), for example. To illustrate this difference, the curve in the plot of FIG. 1D is replicated as a solid line in the plot of FIG. 1E and compared with the response of a theoretical dipole antenna (illustrated by the dashed line in the plot of FIG. 1E). As illustrated, while the change in frequency response may range from 0% to about −3% from 0% to 100% fill level for the slot antenna described herein, an alternative dipole antenna may have a change in frequency response that ranges from 0% to about −30% from 0% to 100% fill level. In some cases, the variation may be even more than 0% to about −30% depending on the characteristics of the liquid within the container. Such a large range of operating frequencies for the alternative dipole antenna may make the signals transmitted by the dipole antenna hard to detect (e.g., below the RFID frequency bands used by an associated RFID reader) across the full range of fill levels. Hence, the slot antenna may have improved functionality across the full range of fill levels compared to the dipole antenna.

Figure 1F:
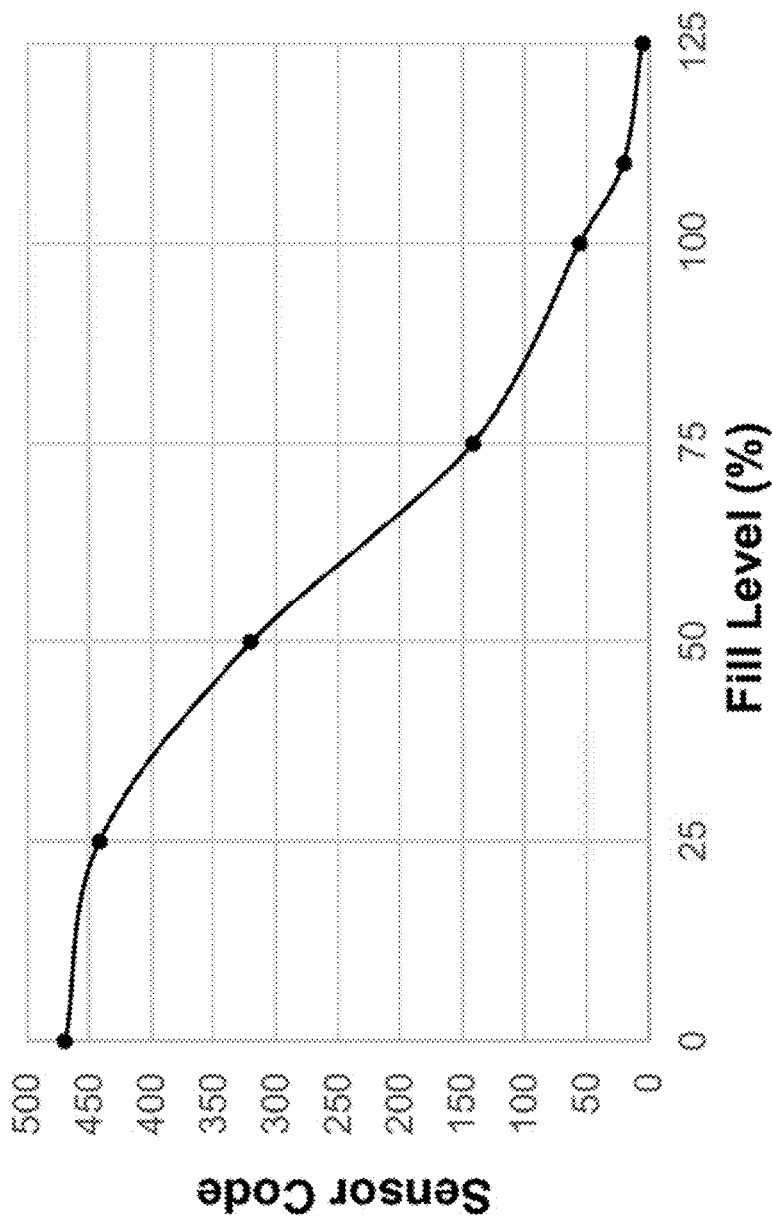
FIG. 1F is an illustration of a sensor code lookup table for an RFID tag, according to example embodiments.

This change in the frequency at peak intensity may be because the liquid within the container 120 has a different dielectric constant than air and/or is electrically conductive to some degree. Further, dielectric constant can affect a substance's impedance (e.g., by affecting capacitance) and/or how that impedance varies with excitation frequency. Hence, when the container 120 contains different proportions of liquid vs. air, a reactance associated with the contents of the container 120 change. This change in reactance may be measured by the integrated circuit using a variable set of capacitors within the RFID tag 110. For example, the integrated circuit may select a subset of capacitors to optimize an RF response of the antenna of the RFID tag 110 (e.g., by modifying the radiated frequency of emitted RF waves until the intensity of the emitted RF waves corresponds to a resonance of the antenna based on the reactance associated with the antenna). Based on the selected subset of capacitors, a sensor code value can be determined. This sensor code value may correspond to a predetermined sensor code value that is stored within a memory (e.g., within a lookup table) associated with the integrated circuit. An example sensor code lookup table is illustrated in FIG. 1F. The sensor code lookup table illustrated may correspond to a sensor code lookup table for the AXZON MAGNUS-S3 M3D integrated circuit, for example. As illustrated, the range of sensor codes (i.e., sensor code values or code values) may range from about 0 to about 470. Other ranges are also possible and contemplated herein (e.g., based on container size, container shape, or properties of the associated liquid within the container). The sensor codes may be a function of frequency (e.g., the sensor codes in FIG. 1F may vary with the transmission frequency of the antenna). As such, the sensor code may be measured while transmitting a predetermined frequency value with the antenna such that the measurement can be properly correlated with the sensor code lookup table. Further, the sensor code lookup table may include sensor codes corresponding to fill levels (e.g., measured in percent) from 0% (e.g., empty) to 125% (e.g., overfilled beyond recommended capacity) or more. As illustrated, the sensor codes may be inversely related to the fill level. As examples from the sensor code lookup table illustrated in FIG. 1F, a fill level of 0% may correspond to a sensor code of about 470, a fill level of 25% may correspond to a sensor code of about 442, a fill level of 50% may correspond to a sensor code of about 320, a fill level of 75% may correspond to a sensor code of about 141, a fill level of 100% may correspond to a sensor code of about 55, a fill level of 110% may correspond to a sensor code of about 20, and a fill level of 125% may correspond to a sensor code of about 5. The sensor code lookup table may include interpolated values. For example, there may be measured sensor codes relating to prescribed fill levels of 0%, 25%, 50%, 75%, 100%, 110%, and 125% (represented by the dots on the plot of FIG. 1F), and intervening sensor codes between those prescribed fill levels may be determined based on interpolation (represented by the solid lines connecting the dots on the plot of FIG. 1F).

Further, the predetermined sensor code value stored within the memory may correspond to a given reactance associated with the antenna (or, similarly, a given impedance associated with the antenna). The integrated circuit may transmit the given reactance to an RFID reader in response to an RFID signal to indicate a liquid level within the container 120. Additionally or alternatively, the integrated circuit, itself, may determine a liquid level within the container 120 based on the determined reactance and then may transmit the determined liquid level to the RFID reader.

Based on the above, when the peak intensity in the measured frequency response is at the first frequency, the integrated circuit may determine that the liquid level is at its maximum level (e.g., full or overfilled), whereas when the peak intensity in the measured frequency response is at the second frequency, the integrated circuit may determine that the liquid level is at its minimum level (e.g., empty). Additionally, the integrated circuit may determine liquid levels between the maximum level and the minimum level by determining the frequency corresponding to a peak in the frequency response associated with the RFID tag 110 and then interpolating between the first frequency and the second frequency. Such interpolated values may be determined (e.g., and later communicated to the RFID reader) at various increments (e.g., 0.01 mL, 0.05 mL, 0.1 mL, 0.5 mL, 1.0 mL, 1.5 mL, 2.0 mL, 2.5 mL, 3.0 mL, 3.5 mL, 4.0 mL, 4.5 mL, 5.0 mL, 10.0 mL, 50 mL, 100 mL, 500 mL, 1.0 L, etc.).

It is understood that such liquid levels may also correspond to dilution levels of the liquid within the container 120. For example, if the amount of solute in the container 120 is known, and a volume of the liquid is determined using the techniques described herein, the integrated circuit of the RFID tag 110 (or another computing device, such as a computing device of an associated RFID reader) may determine a dilution level. Further, it is understood that other differences between the first frequency and the second frequency (besides between 20 MHz and 30 MHz) are also possible (e.g., between 0 MHz and 5 MHz, between 5 MHz and 10 MHz, between 10 MHz and IS MHz, between IS MHz and 20 MHz, between 30 MHz and 35 MHz, or between 35 MHz and 40 MHz).

As described above, the peak intensity of the frequency response may shift with changing volume of the liquid in the container 120. In addition, the intensity corresponding to any specific frequency within the spectrum will also change with changing liquid level. Hence, additionally or alternatively, the integrated circuit of the RFID tag 110 may determine the liquid level of a liquid inside of the container 120 by measuring a response associated with the antenna at a predetermined frequency. For example, the antenna may be designed with a specific resonant frequency (e.g., a resonant frequency in the RF spectrum). The change in the magnitude of the response at that resonant frequency may be measured by the integrated circuit to determine how the liquid level within the container 120 has changed.

Additionally, the container 120 may be specifically designed (e.g., in shape, size, and material) to house contents (e.g., gases, liquids (including mixtures or solutions), or solids) within the container 120. In some embodiments, the container 120, in various embodiments, may be a glass container. For example, the container 120 may be a glass beverage container, such as a glass soda bottle, a glass beer bottle, a glass wine bottle, a glass liquor bottle, a pint glass, a wine glass, a champagne flute, a cocktail glass, etc. In other embodiments, the container 120 may be configured to store biological samples, drugs, or vaccines (e.g., the container 120 may be a test tube, a slide, a vial, a flask, a beaker, a graduated cylinder, a petri dish, an intravenous fluid solution bag, a waste container, etc.). Additionally or alternatively, the container 120 may be a plastic container. For example, the container 120 may be a portable fuel tank or a plastic beverage container, such as a 20 oz. soda bottle, a 2 L bottle, a plastic liquor bottle, etc. It is understood that other form factors, sizes, and shapes for containers are possible, and are contemplated herein.

In some embodiments, the container 120 may also include one or more labels (e.g., human-readable labels). Such labels may be placed on the container 120 behind the RFID tag 110, on the container 120 adjacent to the RFID tag 110, or on another location on the container 120 (e.g., on a cap of the container 120 or on a base of the container 120). Further, labels on the container 120 may be paper labels, polymer labels, or metallic labels. In some embodiments, such labels may not interfere with the RFID tag 110. In addition, the RFID tag 110 may be designed to accommodate such labels so as to minimize or eliminate interference between the label(s) and the RFID tag 110. Additionally or alternatively, one or more labels (e.g., human-readable labels) may be printed on or otherwise disposed on the RFID tag 110.

Figure 2A:
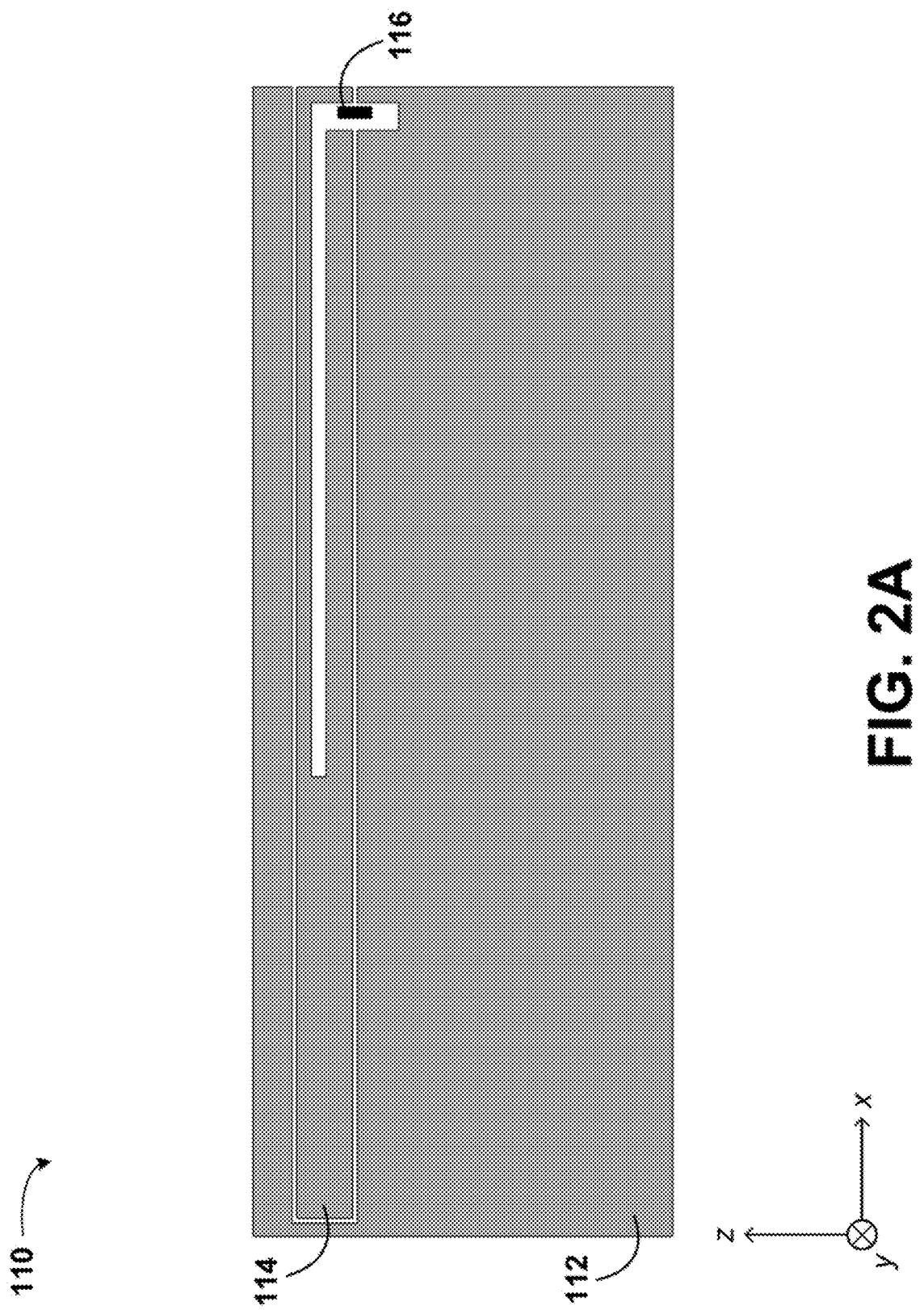
FIG. 2A is an illustration of an RFID tag, according to example embodiments.

FIG. 2A is an illustration of the RFID tag 110 illustrated in FIGS. 1A and 1B, according to example embodiments. As illustrated, the RFID tag 110 includes a ground plane 112 and a radiating plane 114. The RFID tag 110 may also include an integrated circuit 116, as described above. The ground plane 112 and the radiating plane 114 may form a slot antenna, as illustrated in FIG. 2A. The length (e.g., x-dimension based on the axes illustrated in FIG. 2A) of the slot in which the radiating plane 114 is formed may be approximately equal to $\lambda/4$, $\lambda/2$, or integer multiples of $\lambda/4$ or $\lambda/2$, where $\lambda$ represents a wavelength (e.g., a center wavelength or a most frequently used wavelength) of the signals radiated by the antenna of the RFID tag 110.

In some embodiments, the integrated circuit 116 may include an on-board memory and a processor. The processor may include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The on-board memory may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), etc. The on-board memory of the integrated circuit 116 may include instructions that, when executed by the processor, may allow the processor to perform functions including, but not limited to: measuring a frequency response associated when the antenna and/or measuring the response of the antenna at a given frequency, determining a liquid level within the container 120 based on such measurements, communicating (e.g., receiving and transmitting signals using the antenna) with an RFID reader, generating codes for transmitting temperatures and/or liquid levels to the RFID reader, decoding instruction codes received from the RFID reader, determining timestamps associated events (e.g., transmissions received from the RFID reader, transmissions to the RFID reader, liquid level measurements, temperature measurements, etc.), and storing data within the on-board memory. Notably, the integrated circuit 116 may execute instructions such that the RFID tag 110 communicates liquid levels within the container 120 (e.g., with associated timestamps) and/or temperatures of the container 120 (e.g., with associated timestamps) to an RFID reader (e.g., in response to the RFID tag 110 receiving an RFID signal from the RFID reader). In some embodiments, such communications back to the RFID reader may be based on a signal strength associated with the RFID signal received from the RFID reader.

The integrated circuit 116 may be connected to the antenna terminals (e.g., terminals of the ground plane 112 and the radiating plane 114) using inductive or capacitive coupling methods, in various embodiments. In addition, while not directly pictured, the integrated circuit 116 may include on-board sensors (e.g., a temperature sensor, a humidity sensor, and/or a pressure sensor). These sensors can be used to monitor the container 120, contents of the container 120, and/or a surrounding environment. Further, the readings of such sensors may be communicated to an RFID reader and/or stored within the on-board memory of the integrated circuit 116. For example, RFID tag 110 may be a passive RFID tag that is energized by the RFID signal from the RFID reader. In such embodiments, the readings of the sensors may be transiently stored in on-board memory (e.g., reserve memory, such as dynamic random-access memory (RAM)) while the RFID tag 110 is energized by the RFID signal until the readings can be communicated back to the RFID reader. Then, upon the RFID tag 110 become de-energized, the on-board memory may be cleared. Hence, while in some embodiments the sensor readings and/or associated timestamps may be stored long-term in an on-board memory of the RFID tag 110, in other embodiments, the on-board memory of the RFID tag 110 may not retain the sensor readings after the RFID tag 110 has been de-energized.

As illustrated in FIG. 2A, the ground plane 112 may be larger in surface area than the radiating plane 114. Further, the radiating plane 114 may have an aspect ratio (in width:height) of between 15:1 and 20:1 (e.g., where 20:1 may be equal to a quarter of the radiating wavelength or half of the radiating wavelength, which may be the minimum requirement to obtain antenna resonance), whereas the ground plane 112 may have an aspect ratio (in width:height) of between 2:1 and 5:1. In some embodiments, the antenna may be between 35 and 40 mm wide and between 10 mm and 15 mm tall. However, other sizes and shapes for the ground plane 112 and the radiating plane 114 are also possible and are contemplated herein. For example, the ground plane 112 and the radiating plane 114 need not be rectangular. For example, the ground plane 112 and/or the radiating plane 114 could have other shapes in other embodiments (e.g., circular shapes, spiral shapes, interdigitated shapes, triangular shapes, square shapes, pentagonal shapes, hexagonal shapes, heptagonal shapes, octagonal shapes, nonagonal shapes, decagonal shapes, etc.). Further, aspects of the antenna (e.g., slots between the ground plane 112 and the radiating plane 114 and/or dimensions, shapes, or materials of the ground plane 112 and/or the radiating plane 114) may be determined based on the size of the container 120, a thickness of the container 120, a shape of the container 120, a material of the container 120, properties of the liquid within the container 120 (e.g., a dielectric constant of the liquid contained within the container 120), and/or a chemical composition of the liquid within the container 120. Hence, different containers 120 with different liquid contents may have differently sized and shaped antennae. For example, if the container 120 is a 1.0 L bottle of whiskey, the antenna may run from the top of the container 120 to the bottom of the container 120 (e.g., the antenna may be about 150 mm in length). Further, an antenna designed for use with such a container 120 may be roughly triangular in shape (e.g., about 20 mm wide at the top of the antenna and about 1 mm wide at a bottom of the antenna).

The readings from the temperature sensor and/or the liquid level determined based on the reactance associated with the antenna may be communicated to an RFID reader in response to an RFID signal using a code value, in some embodiments. For example, in various embodiments, the liquid level may correspond to a code value between 0 and 255, between 0 and 100, or between 5 and 470 depending on fill level within the container 120. Additionally or alternatively, a temperature offset code based on calibration data may be used to convert a reading from a temperature sensor into a proper temperature value. Such liquid-level and/or temperature code values may be stored within a lookup table of an on-board memory of the integrated circuit 116 and looked up by the integrated circuit 116 based on a determined reactance associated with the antenna when determining liquid level and/or when communicating with an RFID reader. Further, in some embodiments, code values associated with sensor(s) (e.g., the temperature sensor) on the RFID tag 110 may be the only information stored within the on-board memory. Such embodiments may allow the on-board memory to be relatively small in terms of storage space, for example.

In some embodiments, the on-board memory may store identification information about the RFID tag 110 (e.g., a tag identifier such as an identification code, an identification number, or an electronic product code (EPC)). In some embodiments, in order to prevent malicious tampering with the sensor code values, tag-identification information, and/or other information stored within the on-board memory of the RFID tag 110, the on-board memory may be locked. In other words, the on-board memory may not be written to (either by an RFID reader or a third-party device) once the RFID tag 110 has been designated for use. In some cases, this may prevent an end-user from reprogramming static sensor code values or communication protocols of the on-board memory, counterfeiting the RFID tag 110, and/or repurposing the RFID tag 110.

As described above, the RFID tag 110 may include a slot antenna (e.g., that includes the ground plane 112 and the radiating plane 114). The slot antenna may represent an alternative to dipole antenna arrangements. As also described above, the sensor code values measured by the associated integrated circuit 116, the reactance of the antenna measured by the associated integrated circuit 116, and/or the resonant frequency/wavelength of the antenna may change as a result of a change in the liquid level in the container. These change(s) may be accompanied by and/or a result of a change in the surface current along regions of the antenna of the RFID tag 110 (e.g., along portions of the ground plane 112 and/or the radiating plane 114) as a result of the liquid level of the container changing. An example change in surface current is illustrated in FIGS. 2B and 2C.

Figure 2B:
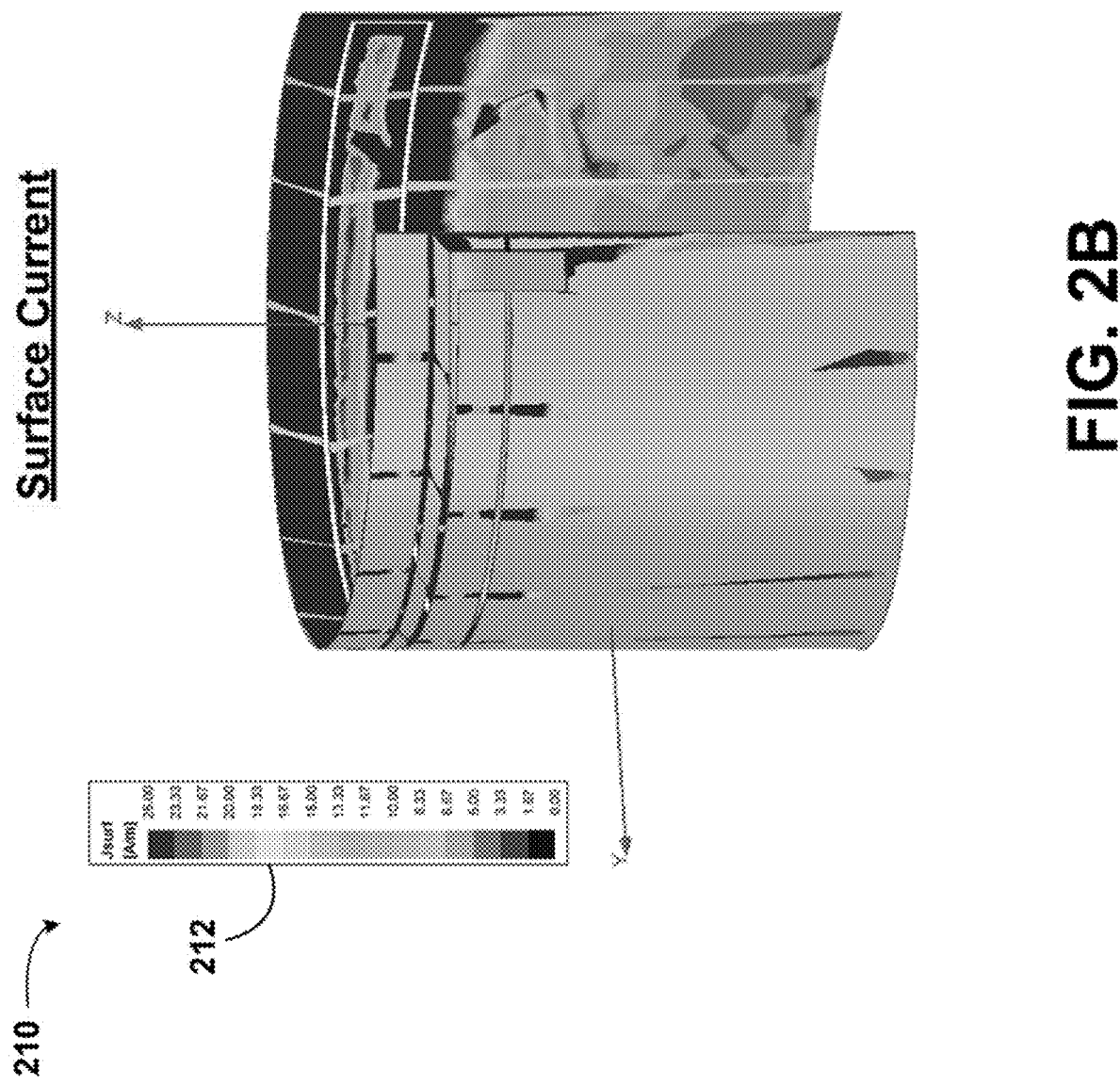
FIG. 2B is an illustration of surface current for an RFID tag, according to example embodiments.

FIG. 2B is a plot 210 of the surface current (e.g., in amps/meter) of the RFID tag 110 (illustrated three-dimensionally as a flat plane curved about the vertical axis) when the container around which the RFID tag 110 is wrapped has a 0% fill level (e.g., when the container is empty). FIG. 2B includes a key 212 indicating the surface current corresponding to the coloration.

Figure 2C:
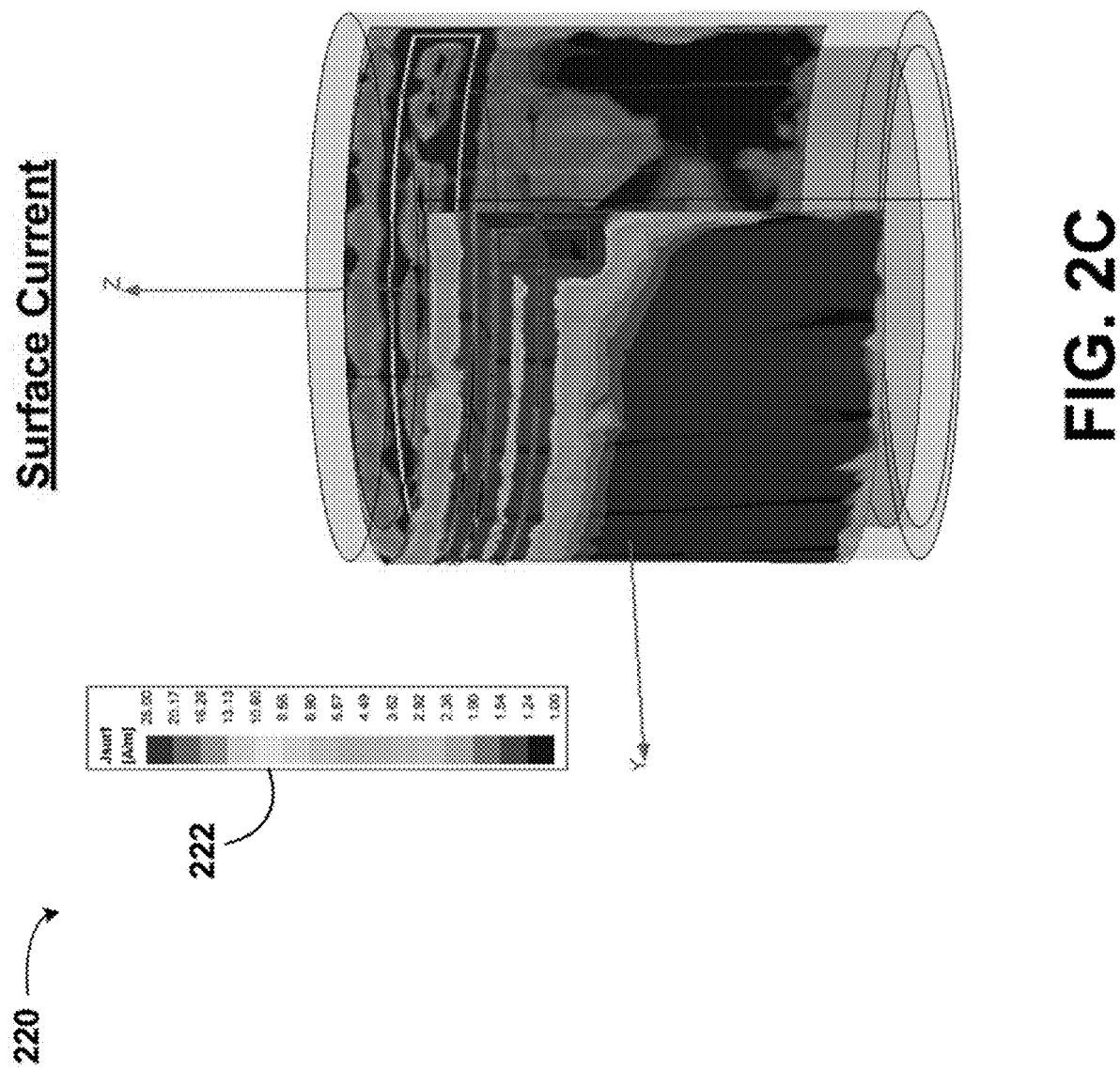
FIG. 2C is an illustration of surface current for an RFID tag, according to example embodiments.

Similarly, FIG. 2C is a plot 220 of the surface current (e.g., in amps/meter) of the RFID tag 110 (illustrated three-dimensionally as a flat plane curved about the vertical axis) when the container around which the RFID tag 110 is wrapped has a 100% fill level (e.g., when the container is full). FIG. 2C includes a key 222 indicating the surface current corresponding to the coloration. The coloration and corresponding surface currents in the key 222 of FIG. 2C are the same as in the key 212 of FIG. 2B. Hence, a direct comparison can be made between FIGS. 2B and 2C. By comparing the surface currents illustrated in FIGS. 2B and 2C, it is clear that that surface current is significantly higher, generally, when the container has a 100% fill level (e.g., as illustrated in FIG. 2C).

Figure 2D:
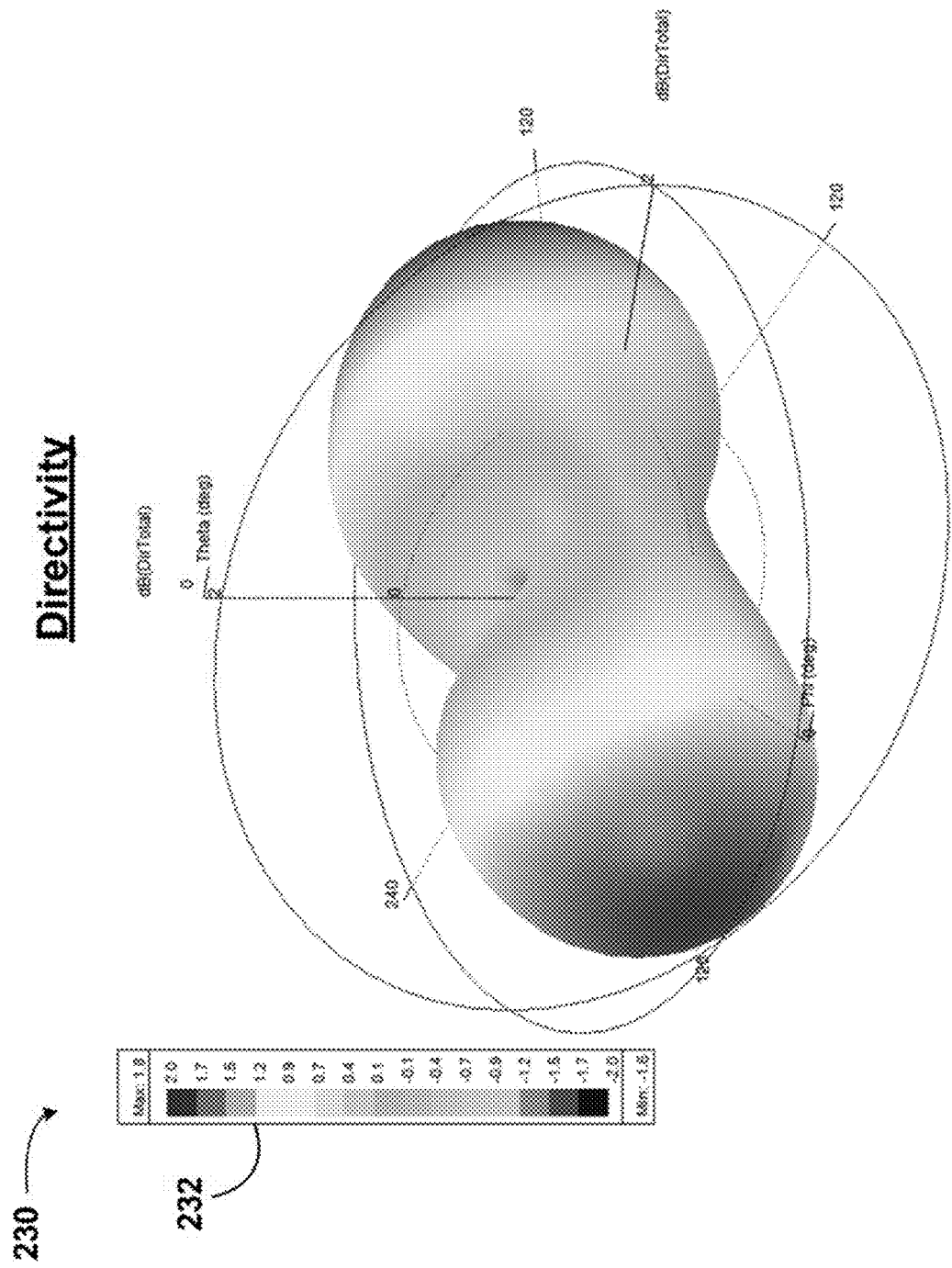
FIG. 2D is an illustration of directivity of an antenna of an RFID tag, according to example embodiments.
Figure 2E:
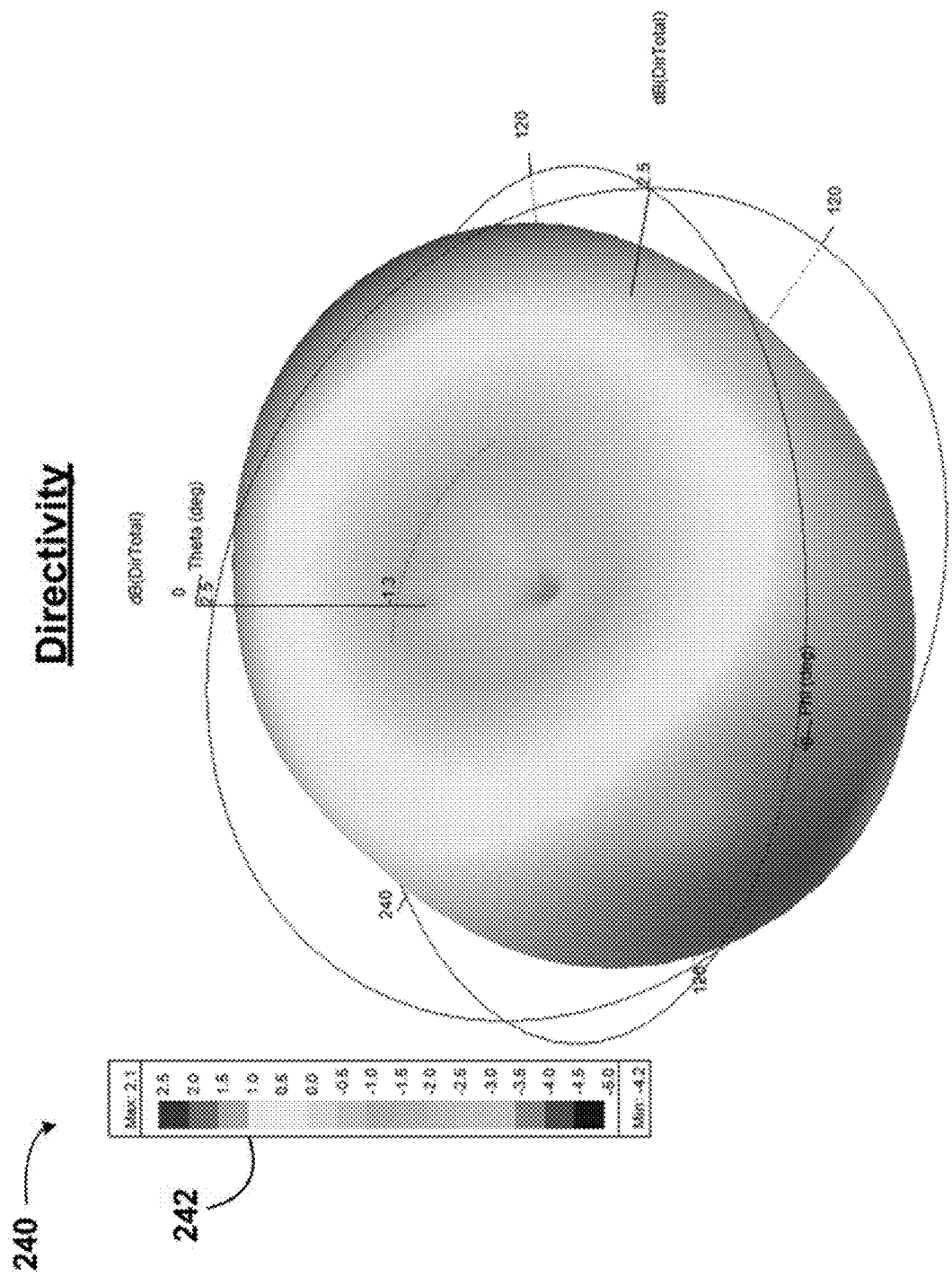
FIG. 2E is an illustration of directivity of an antenna of an RFID tag, according to example embodiments.

In addition to the surface current being modified when the fill level of the corresponding container is changed, the directivity of the antenna of the RFID tag 110 (e.g., as measured based on radiative signal intensity) may also change when the fill level changes. FIG. 2D is a plot 230 of the directivity (e.g., in dB) of the antenna of the RFID tag 110 when the associated container has a 0% fill level. FIG. 2D includes a key 232 indicating the relative directivity corresponding to the coloration. Likewise, FIG. 2E is a plot 240 of the directivity (e.g., in dB) of the antenna of the RFID tag 110 when the associated container has a 100% fill level. FIG. 2E includes a key 242 indicating the relative directivity corresponding to the coloration. As illustrated by the relative shapes and coloration, the antenna of the RFID tag 110 has more directionality when the container has a 0% fill level. This feature could be measured by an RFID reader based on radiative intensity of signals radiated by the antenna, for example, and could be used (e.g., by the RFID reader) to determine liquid level within the container.

Figure 3:
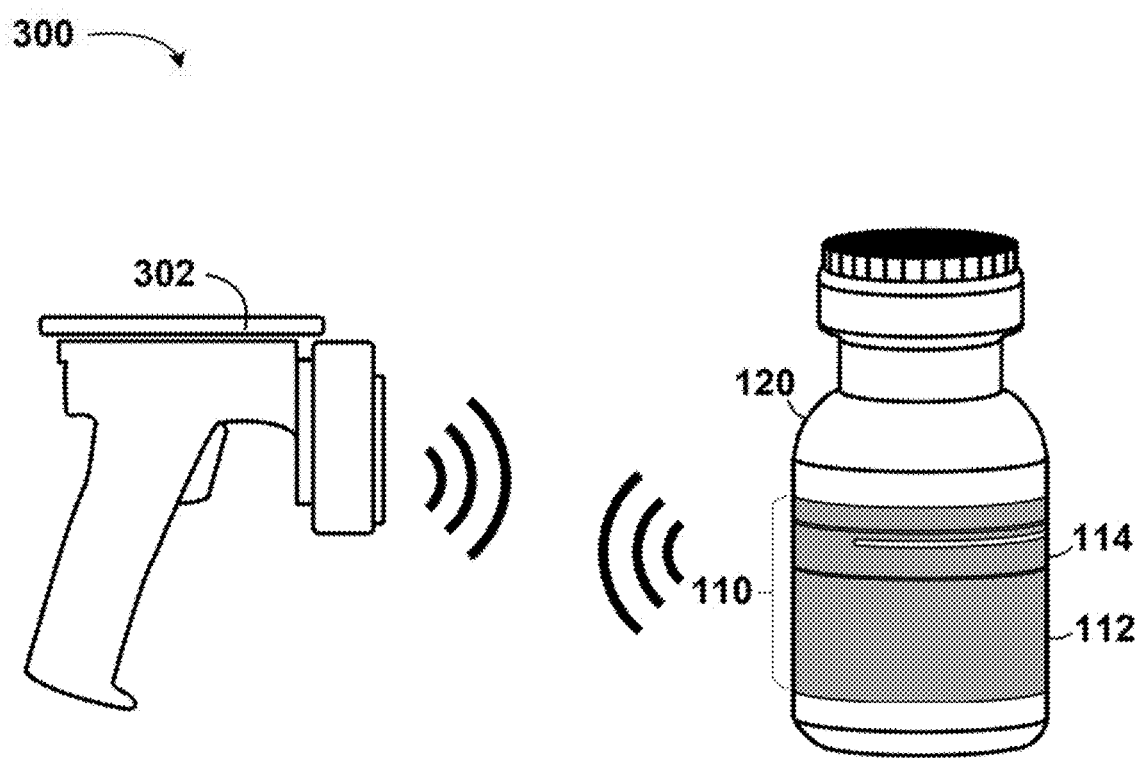
FIG. 3 is an illustration of a system, according to example embodiments.

FIG. 3 is an illustration of a system 300, according to example embodiments. The system 300 may include an RFID reader 302 and a container equipped with an RFID tag (e.g., the container 120 equipped with the RFID tag 110 shown and described with reference to FIGS. 1A, 1B, and 2). The RFID reader 302 may be configured to read information from one or more RFID tags in order to identify the objects to which the RFID tags are attached. As described herein, the RFID reader 302 may be able to communicate with the RFID tag 110 in order to determine the contents of the container 120, a volume of a liquid within the container 120, and/or a temperature of a liquid within the container 120.

The RFID reader 302 may communicate with the RFID tag 110 by transmitting an RFID signal to the RFID tag 110. As such, the RFID reader 302 may include a power source (e.g., a battery, a capacitor, or a connection to an electrical outlet), a transmitter, and a receiver. The transmitter may be configured to emit the RFID signal at a predetermined frequency to communicate with the RFID tag 110. Further, the RFID signal may include one or more identifying characteristics (e.g., modulation frequency, communication code, etc.) to indicate to the RFID tag 110 that the RFID reader 302 is authorized to receive information from the RFID tag 110 about the container 120 (e.g., to receive information about the liquid level of the container 120 or the contents of the container 120). The receiver of the RFID tag 110 may receive information communicated by the RFID tag 110 back to the RFID reader 302.

In some embodiments, the RFID reader 302 may have an associated memory (e.g., a computer-readable medium, such as a ROM, a hard drive, a RAM, or cloud storage). Such a memory may be on-board the RFID reader 302 and/or communicatively coupled to the RFID reader 302. The communicative coupling may be via a wired connection (e.g., a connection over a universal serial bus (USB) cable) or a wireless connection (e.g., a connection of WIFI® or BLUETOOTH®). The memory may be configured to store data received from the RFID tag 110 for later access/review. For example, the memory may store one or more liquid levels and/or liquid temperatures associated with the container 120 and the RFID 110 based on information received from the RFID tag 110. Further, in some embodiments, the RFID reader 302 may receive timestamps from the RFID tag 110 associated with one or more of the liquid level measurements and/or one or more of the temperature measurements. Such timestamps may likewise be stored in a memory of the RFID reader 302. Additionally or alternatively, liquid level measurements, temperature measures, expiration status, etc. may be communicated by the RFID reader (e.g., over WIFI, BLUETOOTH, ETHERNET connection, cellular network, etc.) to be stored in a cloud storage location or in a remote data center for later access.

It is understood that the information stored in a memory of the RFID reader 302 may be additionally and/or alternatively stored on a memory associated with the RFID tag 110 (e.g., an on-board memory of the RFID tag 110) and/or on an auxiliary memory that is associated with neither the RFID reader 302 nor the RFID tag 110. For example, an auxiliary memory may receive and store a series of timestamps and associated liquid levels and temperatures from the RFID reader 302 in response to the RFID reader 302 receiving data from the RFID tag 110. In some embodiments, the auxiliary memory may be associated with a pharmaceutical corporation, a drug manufacturer, a drug distributed, a common carrier (e.g., a delivery service), and/or a governmental agency (e.g., the Food and Drug Administration (FDA), the National Institute of Health (NIH), or the Centers for Disease Control and Prevention (CDC)). In some embodiments, such an auxiliary memory may not be read by either the RFID reader 302 or the RFID tag 110.

III. Example Processes

Figure 4:
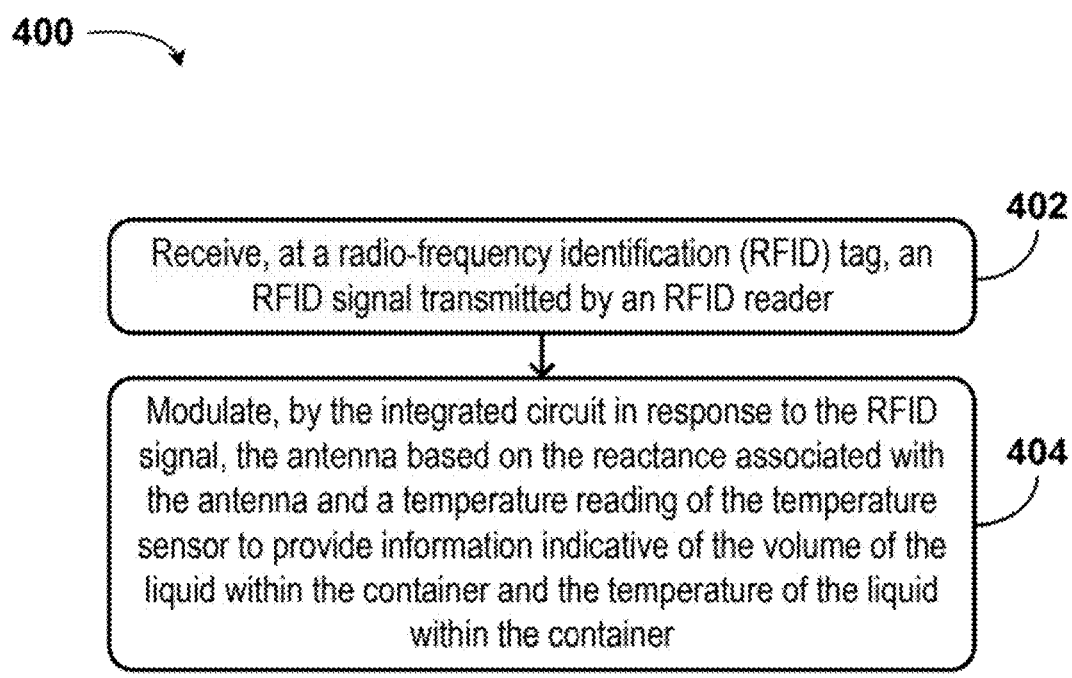
FIG. 4 is a flowchart illustration of a method, according to example embodiments.

FIG. 4 is a flowchart diagram of a method 400, according to example embodiments. The method 400 may be performed by the RFID tag 110 of FIGS. 1A-3, for example.

At block 402, the method 400 may include receiving, at a radio-frequency identification (RFID) tag, an RFID signal transmitted by an RFID reader. The RFID tag includes an antenna. The antenna includes a radiating plane. The antenna also includes a ground plane. The RFID tag is attached to a container. A reactance associated with the antenna is modifiable based on a volume of a liquid within the container and proximate to the ground plane. The RFID tag also includes an integrated circuit that includes a memory, and a temperature sensor configured to provide information indicative of a temperature of the liquid within the container.

At block 404, the method 400 may include modulating, by the integrated circuit in response to the RFID signal, the antenna based on the reactance associated with the antenna, and a temperature reading of the temperature sensor to provide information indicative of the volume of the liquid within the container and the temperature of the liquid within the container.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

Embodiments of the present disclosure may thus relate to one of the enumerated example embodiments (EEEs) listed below.

EEE 1 is a radio-frequency identification (RFID) tag comprising:
an antenna configured to communicate with an RFID reader, wherein the antenna comprises:
a radiating plane; and
a ground plane,
wherein the RFID tag is attachable to a container, and
wherein a reactance associated with the antenna is modifiable based on a volume of a liquid within the container and proximate to the ground plane; and
an integrated circuit comprising a memory and a temperature sensor configured to provide information indicative of a temperature of the liquid within the container, wherein the integrated circuit is configured to:
in response to an RFID signal from the RFID reader, modulate the antenna based on the reactance associated with the antenna and a temperature reading of the temperature sensor to provide information indicative of the volume of the liquid within the container and the temperature of the liquid within the container.

EEE 2 is the RFID tag of EEE 1,
wherein the container is a glass container, and
wherein the RFID tag is attachable to the container such that the ground plane is touching the glass container.

EEE 3 is the RFID tag of EEE 1,
wherein the container is a plastic container, and
wherein the RFID tag is attachable to the container such that the ground plane is touching the plastic container.

EEE 4 is the RFID tag of any of EEEs 1-3, wherein the container is penetrable by electromagnetic waves within the radio-frequency (RF) spectrum.

EEE 5 is the RFID tag of any of EEEs 1-4, wherein the integrated circuit is configured to determine the reactance associated with the antenna by measuring a response associated with the antenna at a predetermined frequency.

EEE 6 is the RFID tag of any of EEEs 1-5, wherein the integrated circuit is configured to determine the reactance associated with the antenna by measuring a frequency response associated with the antenna.

EEE 7 is the RFID tag of EEE 6,
wherein a peak intensity of the frequency response corresponds to a first frequency when the volume of the liquid is at a maximum level of the liquid within the container,
wherein the peak intensity of the frequency response corresponds to a second frequency when the volume of the liquid is at a minimum level of the liquid within the container, and
wherein a difference between the first frequency and the second frequency is between 3% and 10%.

EEE 8 is the RFID tag of EEE 7,
wherein the antenna further comprises a slot between the radiating plane and the ground plane, and
wherein the slot is configured to be positioned above the maximum level of the liquid within the container or near the maximum level of the liquid within the container.

EEE 9 is the RFID tag of any of EEEs 1-8,
wherein modulating the antenna in response to the RFID signal comprises:
determining a code value from a lookup table based on the reactance associated with the antenna; and
communicating the code value to the RFID reader, and
wherein the lookup table is stored within the memory.

EEE 10 is the RFID tag of any of EEEs 1-9, wherein a size of the radiating plane, a size of the ground plane, a shape of the radiating plane, a shape of the ground plane, a material of the radiating plane, or a material of the ground plane is based on:
a chemical composition of the liquid;
properties of the liquid;
a size of the container;
a thickness of the container;
a material of the container; or
a shape of the container.

EEE 11 is the RFID tag of any of EEEs 1-10,
wherein the radiating plane has an aspect ratio, in width:height, of between 15:1 and 20:1, and
wherein the ground plane has an aspect ratio, in width:height, of between 2:1 and 5:1.

EEE 12 is the RFID tag of any of EEEs 1-11, wherein the container comprises a paper label, a polymer label, or a metallic label.

EEE 13 is the RFID tag of any of EEEs 1-12, wherein the liquid comprises a biological sample.

EEE 14 is the RFID tag of EEE 13, wherein the container is a test tube.

EEE 15 is the RFID tag of any of EEEs 1-12, wherein the liquid comprises a beverage.

EEE 16 is the RFID tag of EEE 15, wherein the container is a glass bottle or a plastic bottle.

EEE 17 is the RFID tag of any of EEEs 1-12, wherein the liquid comprises a vaccine.

EEE 18 is the RFID tag of EEE 17, wherein the container is a vial.

EEE 19 is the RFID tag of any of EEEs 1-12, wherein the liquid comprises a fuel.

EEE 20 is the RFID tag of EEE 19, wherein the container is a fuel tank.

EEE 21 is the RFID tag of any of EEEs 1-12, wherein the container is a vial, a test tube, a beverage can, a glass beverage bottle, a fuel container, an intravenous fluid solution bag, a waste container, or a water reservoir.

EEE 22 is the RFID tag of any of EEEs 1-21, wherein the radiating plane is triangular in shape.

EEE 23 is the RFID tag of any of EEEs 1-22, wherein the ground plane is triangular in shape.

EEE 24 is the RFID tag of any of EEEs 1-23, wherein the integrated circuit is further configured to, in response to the RFID signal from the RFID reader, modulate the antenna to provide information indicative of:
a universal expiry date of the liquid within the container,
an expiry date once the container has been opened;
an amount of time elapsed since the container has been opened; or
a time at which the temperature reading fell outside of a predetermined temperature range.

EEE 25 is the RFID tag of any of EEEs 1-24, wherein the integrated circuit is electrically coupled to one or more terminals of the antenna via inductive coupling or capacitive coupling.

EEE 26 is a system comprising:
a container configured to be filled with a liquid; and
a radio-frequency identification (RFID) tag attached to the container, wherein the RFID tag comprises:
an antenna configured to communicate with an RFID reader, wherein the antenna comprises:
a radiating plane; and
a ground plane, wherein a reactance associated with the antenna is modifiable based on a volume of the liquid within the container and proximate to the ground plane; and
an integrated circuit comprising a memory and a temperature sensor, wherein the temperature sensor is configured to provide information indicative of a temperature of the liquid within the container, wherein the integrated circuit is configured to:
in response to an RFID signal from the RFID reader, modulate the antenna based on the reactance associated with the antenna and a temperature reading of the temperature sensor to provide information indicative the volume of the liquid within the container and the temperature of the liquid within the container.

EEE 27 is the system of EEE 26, wherein the integrated circuit is further configured to modulate the antenna in response to the RFID signal from the RFID reader based on a signal strength of the RFID signal.

EEE 28 is a method comprising:
receiving, at a radio-frequency identification (RFID) tag, an RFID signal transmitted by an RFID reader, wherein the RFID tag comprises:
an antenna comprising:
a radiating plane; and
a ground plane,
wherein the RFID tag is attached to a container, and
wherein a reactance associated with the antenna is modifiable based on a volume of a liquid within the container and proximate to the ground plane; and
an integrated circuit comprising a memory and a temperature sensor configured to provide information indicative of a temperature of the liquid within the container; and
modulating, by the integrated circuit in response to the RFID signal, the antenna based on the reactance associated with the antenna and a temperature reading of the temperature sensor to provide information indicative of the volume of the liquid within the container and the temperature of the liquid within the container.

EEE 29 is the method of EEE 28, wherein modulating the antenna further provides information indicative of a time stamp.

EEE 30 is the method of EEEs 28 or 29, wherein the volume of the liquid within the container is determined to a nearest 0.5 mL increment.

EEE 31 is the method of any of EEEs 28-30, further comprising storing the volume of the liquid and an associated time stamp in a memory associated with the RFID reader.

What is claimed is:
1. A radio-frequency identification (RFID) tag comprising:
an antenna configured to communicate with an RFID reader, wherein the antenna comprises:
a radiating plane; and
a ground plane,
wherein the RFID tag is attachable to a container, and
wherein a reactance associated with the antenna is modifiable based on a volume of a liquid within the container and proximate to the ground plane; and
an integrated circuit comprising a memory and a temperature sensor configured to provide information indicative of a temperature of the liquid within the container, wherein the integrated circuit is configured to:
in response to an RFID signal from the RFID reader, modulate the antenna based on the reactance associated with the antenna and a temperature reading of the temperature sensor to provide information indicative of the volume of the liquid within the container and the temperature of the liquid within the container.

2. The RFID tag of claim 1,
wherein the container is a glass container, and
wherein the RFID tag is attachable to the container such that the ground plane is touching the glass container.

3. The RFID tag of claim 1,
wherein the container is a plastic container, and
wherein the RFID tag is attachable to the container such that the ground plane is touching the plastic container.

4. The RFID tag of claim 1, wherein the container is penetrable by electromagnetic waves within the radio-frequency (RF) spectrum.

5. The RFID tag of claim 1, wherein the integrated circuit is configured to determine the reactance associated with the antenna by measuring a response associated with the antenna at a predetermined frequency.

6. The RFID tag of claim 1, wherein the integrated circuit is configured to determine the reactance associated with the antenna by measuring a frequency response associated with the antenna.

7. The RFID tag of claim 6,
wherein a peak intensity of the frequency response corresponds to a first frequency when the volume of the liquid is at a maximum level of the liquid within the container,
wherein the peak intensity of the frequency response corresponds to a second frequency when the volume of the liquid is at a minimum level of the liquid within the container, and
wherein a difference between the first frequency and the second frequency is between 3% and 10%.

8. The RFID tag of claim 7,
wherein the antenna further comprises a slot between the radiating plane and the ground plane, and
wherein the slot is configured to be positioned above the maximum level of the liquid within the container or near the maximum level of the liquid within the container.

9. The RFID tag of claim 1,
wherein modulating the antenna in response to the RFID signal comprises:
determining a code value from a lookup table based on the reactance associated with the antenna; and
communicating the code value to the RFID reader, and
wherein the lookup table is stored within the memory.

10. The RFID tag of claim 1, wherein a size of the radiating plane, a size of the ground plane, a shape of the radiating plane, a shape of the ground plane, a material of the radiating plane, or a material of the ground plane is based on:
a chemical composition of the liquid;
properties of the liquid;
a size of the container;

a thickness of the container;
a material of the container; or
a shape of the container.

11. The RFID tag of claim 1,
wherein the radiating plane has an aspect ratio, in width: height, of between 15:1 and 20:1, and
wherein the ground plane has an aspect ratio, in width: height, of between 2:1 and 5:1.

12. The RFID tag of claim 1,
wherein the container comprises a paper label, a polymer label, or a metallic label,
wherein the liquid comprises a biological sample, a beverage, a vaccine, or a fuel,
wherein the container comprises a test tube, a glass bottle, a plastic bottle, a vial, a fuel tank, a beverage can, an intravenous solution bag, a waste container, or a water reservoir, and
wherein the radiating plane is triangular in shape or the ground plane is triangular in shape.

13. The RFID tag of claim 1, wherein the integrated circuit is further configured to, in response to the RFID signal from the RFID reader, modulate the antenna to provide information indicative of:
a universal expiry date of the liquid within the container;
an expiry date once the container has been opened;
an amount of time elapsed since the container has been opened; or
a time at which the temperature reading fell outside of a predetermined temperature range.

14. The RFID tag of claim 1, wherein the integrated circuit is electrically coupled to one or more terminals of the antenna via inductive coupling or capacitive coupling.

15. A system comprising:
a container configured to be filled with a liquid; and
a radio-frequency identification (RFID) tag attached to the container, wherein the RFID tag comprises:
an antenna configured to communicate with an RFID reader, wherein the antenna comprises:
a radiating plane; and
a ground plane, wherein a reactance associated with the antenna is modifiable based on a volume of the liquid within the container and proximate to the ground plane; and
an integrated circuit comprising a memory and a temperature sensor, wherein the temperature sensor is configured to provide information indicative of a temperature of the liquid within the container, wherein the integrated circuit is configured to:
in response to an RFID signal from the RFID reader, modulate the antenna based on the reactance associated with the antenna and a temperature reading of the temperature sensor to provide information indicative the volume of the liquid within the container and the temperature of the liquid within the container.

16. The system of claim 15, wherein the integrated circuit is further configured to modulate the antenna in response to the RFID signal from the RFID reader based on a signal strength of the RFID signal.

17. A method comprising:
receiving, at a radio-frequency identification (RFID) tag, an RFID signal transmitted by an RFID reader, wherein the RFID tag comprises:
an antenna comprising:
a radiating plane; and
a ground plane,
wherein the RFID tag is attached to a container, and
wherein a reactance associated with the antenna is modifiable based on a volume of a liquid within the container and proximate to the ground plane; and
an integrated circuit comprising a memory and a temperature sensor configured to provide information indicative of a temperature of the liquid within the container; and
modulating, by the integrated circuit in response to the RFID signal, the antenna based on the reactance associated with the antenna and a temperature reading of the temperature sensor to provide information indicative of the volume of the liquid within the container and the temperature of the liquid within the container.

18. The method of claim 17, wherein modulating the antenna further provides information indicative of a time stamp.

19. The method of claim 17, wherein the volume of the liquid within the container is determined to a nearest 0.5 mL increment.

20. The method of claim 17, further comprising storing the volume of the liquid and an associated time stamp in a memory associated with the RFID reader.

* * * * *